(12) United States Patent
Anderson

(10) Patent No.: US 7,291,398 B2
(45) Date of Patent: Nov. 6, 2007

(54) IONOMER RESINS AS INTERLAYERS FOR USE WITH IMBEDDED OR ATTACHED IR REFLECTIVE OR ABSORPTIVE FILMS IN LAMINATED GLAZING APPLICATIONS

(75) Inventor: Jerrel C. Anderson, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 48 days.

(21) Appl. No.: 10/695,721

(22) Filed: Oct. 28, 2003

(65) Prior Publication Data
US 2005/0089692 A1    Apr. 28, 2005

(51) Int. Cl.
B32B 17/10    (2006.01)
(52) U.S. Cl. .................. 428/442; 156/106; 156/332; 428/437; 428/441; 428/520; 428/522
(58) Field of Classification Search ............... 428/437, 428/441, 442, 520, 522; 156/106, 332
See application file for complete search history.

(56) References Cited

U.S. PATENT DOCUMENTS

| | | | |
|---|---|---|---|
| 3,344,014 A | | 9/1967 | Rees |
| 4,427,743 A | | 1/1984 | Katsuki et al. |
| 4,668,574 A | * | 5/1987 | Bolton et al. ............... 428/339 |
| 4,906,703 A | * | 3/1990 | Bolton et al. .............. 525/29.9 |
| 4,973,611 A | | 11/1990 | Farmer et al. |
| 5,071,206 A | | 12/1991 | Hood et al. |
| 5,082,738 A | * | 1/1992 | Swofford ..................... 428/437 |
| 5,091,258 A | | 2/1992 | Moran |
| 5,131,967 A | | 7/1992 | Tweadey, II et al. |
| 5,208,080 A | | 5/1993 | Gajewski et al. |
| 5,227,241 A | | 7/1993 | Chaussade et al. |
| 5,320,893 A | | 6/1994 | Floyd |
| 5,360,659 A | | 11/1994 | Arends et al. |
| 5,763,062 A | | 6/1998 | Smith et al. |
| 5,796,055 A | | 8/1998 | Benson, Jr. et al. |
| 5,932,329 A | * | 8/1999 | Frost et al. ................. 428/214 |
| 5,979,932 A | | 11/1999 | Jourdaine et al. |
| 6,368,699 B1 | | 4/2002 | Gilbert et al. |
| 6,797,396 B1 | | 9/2004 | Liu et al. |
| 2001/0046595 A1 | | 11/2001 | Moran et al. |
| 2002/0061395 A1 | | 5/2002 | Moran et al. |
| 2002/0068177 A1 | | 6/2002 | Garnier et al. |
| 2005/0106372 A1 | | 5/2005 | Moran et al. |
| 2005/0170160 A1 | | 8/2005 | Moran et al. |
| 2005/0233136 A1 | | 10/2005 | Offermann et al. |

FOREIGN PATENT DOCUMENTS

| | | |
|---|---|---|
| EP | 0469732 A2 | 2/1992 |
| GB | 1 315 489 | 5/1973 |
| WO | WO96/19347 | 6/1996 |
| WO | WO97/01778 | 1/1997 |
| WO | WO99/36808 | 7/1999 |
| WO | WO99/36810 | 7/1999 |
| WO | WO 01/96104 A2 | 12/2001 |
| WO | WO 03/099553 A1 | 12/2003 |

OTHER PUBLICATIONS

International Search Report for counterpart PCT/US2004/036118, Apr. 4, 2005.
Written Opinion of the International Searching Authority for counterpart PCT/US2004/036118, Apr. 4, 2005.
Southwall Technologies XIR Automotive Glass http://www.southwall.com/products/xir_auto.html (Copyright 2003).
Southwall, Visteon, And The U.S. Department Of Energy's National Renewable Energy Laboratory Announce Favorable Test Results Of XIR® SOLAR Reflective Film In Automotive Glazing—May 25, 2001 http://www.corporate-ir.net/ireye/ir_site.zhtml?ticker=swtx&script=410&layout=6&item_id=343869.
Upscale Silicon Valley Retailer Picks Southwall XIR® Laminate to Showcase Apparel—Feb. 13, 2002 http://www.corporate-ir.net/reye/ir_site.zhtml?ticker=swtx&script=410&layout=6&item_id=344772.
Southwall Completes New 2-Year Supply Contract With Saint-Gobain Sekunit For XIR® Automotive Films—Jan. 9, 2002 http://www.corporate.ir.net/ireya/ir_site.zhtml?ticker=swtx&script=swtx&script=410&layout=6&item_id=344321.
Scotchtint Commercial aka Sweets Brochure—Brochure (2003) http://multimedia.mmm.com/mws/mediawebserver.dyn?6666660Zjcf61Vs6EVs666070COrrrrQ-.
Southwall Europe GMBH Delivers First Product To Automotive Industry—Mar. 20, 2001 http://www.corporate-ir.net/ireye/ir_site.zhtml?ticker=swtx&script=410&layout=6&item_id=343863.
Product Bulletin Important news concerning XIR Laminated products—new part numbers. (Copyright 2003) http://www.southwall.com/products/xir_laminated-bulletin.html.
Southwall Technologies' XIR Laminated laminated glass, with performance file sheets (Copyright © 2003 Sothwall Technologies, Inc.) http://www.southwall.com/products.xir_laminaed.html.
Scotchtint Scotchshield Residential Brochure—Brochure (1998) http://multimedia.mmm.com/mws/medlawebserver.dyn?6666660Zjcf61Vs6EVs666-ONfCOrrrrZ-.

* cited by examiner

Primary Examiner—D. S. Nakarani

(57) ABSTRACT

This invention is glass laminate article comprising a film which can block the transmission of infra red (IR) light. A laminate of the present invention comprises at least two sheets of a non-plasticized thermoplastic polymer which forms the outer layers of a three-layer IR-blocking laminate film.

31 Claims, No Drawings

IONOMER RESINS AS INTERLAYERS FOR USE WITH IMBEDDED OR ATTACHED IR REFLECTIVE OR ABSORPTIVE FILMS IN LAMINATED GLAZING APPLICATIONS

BACKGROUND OF THE INVENTION

1. Field of the Invention

This invention relates to laminated glass articles comprising Infra Red reflective films imbedded in the interlayer. This invention more particularly relates to said glass laminates wherein the interlayer is an ethylene/unsaturated acid copolymer ionomer.

2. Description of the Prior Art

Films that either reflect or absorb infra red (IR) light, such as are described in U.S. Pat. No. 6,368,699, WO 9936808A1, WO 9936810A1 and U.S. Pat. No. 5,071,206, can be embedded in laminated glazing structures by sandwiching the film between two sheets of interlayer material, and finally between sheets of glass. Typically interlayers used for this purpose are polyvinyl butyral (PVB) polymer, and the IR film can be autoclaved between the PVB sheets so that the sandwich is sealed along the edges with the PVB.

However, commercially available PVB is typically plasticized and includes other components such as free acidic groups and various ions, all of which can render the structure prone to rapid and intense moisture absorption. Moisture absorbed into the PVB layers can facilitate and accelerate corrosion of the surfaces of coated imbedded IR film. Also, with certain multi-layered films incorporating an optical stack, the plasticizers used in PVB interlayers can bleed between the film layers at edges and cause enough separation to create highly colored iridescence called "edge brightening". Edge brightening is not a desirable characteristic in glass laminates of this type.

It can be desirable to form an IR-blocking laminate film that will not readily absorb moisture or cause corrosion or edge brightening.

SUMMARY OF THE INVENTION

In one aspect, the present invention is a multiple layer interlayer useful for blocking the transmission of infra red (IR) light, comprising: (1) at least two thermoplastic polymer sheets; and (2) a film, positioned between the thermoplastic polymer sheets such that the film is in direct contact on each of its surfaces with the sheets, wherein the film can either reflect or absorb IR light, and wherein the thermoplastic polymer sheets are unplasticized (do not include plasticizer).

In another aspect, the present invention is a multilayer interlayer useful for blocking the transmission of infra red (IR) light, comprising: (1) at least two thermoplastic polymer sheets; and (2) a film, positioned between the thermoplastic polymer sheets such that the film is in direct contact on each of its surfaces with the sheets, wherein the film can either reflect or absorb IR light, wherein the thermoplastic polymer sheets comprise unplasticized ethylene/unsaturated acid copolymer ionomer.

In another aspect, the present invention is a glass laminate useful for blocking the transmission of infra red (IR) light, comprising a multilayer interlayer comprising: (1) at least two thermoplastic polymer sheets; and (2) a film, positioned between the thermoplastic polymer sheets such that the film is in direct contact on each of its surfaces with the sheets, wherein the film can either reflect or absorb IR light, wherein the thermoplastic polymer sheets do not include plasticizer.

In another aspect, the present invention is a glass laminate useful for blocking the transmission of infra red (IR) light, comprising a multilayer interlayer which comprises: (1) at least two thermoplastic polymer sheets; and (2) a film, positioned between the thermoplastic polymer sheets such that the film is in direct contact on each of its surfaces with the sheets, wherein the film can either reflect or absorb IR light, and wherein the thermoplastic polymer sheets comprise unplasticized ethylene/unsaturated acid copolymer ionomer.

In another aspect, the present invention is a process for manufacturing a multiple layer laminate article of the present invention comprising the steps: (1) priming at least one of the multiple layers of the laminate by application of a primer solution before assembling the layers; (2) assembling at least three layers to be used as component layers for the laminate article, wherein at least one layer is an IR-blocking film, and wherein at least two of the layers are unplasticized thermoplastic polymer sheets; (3) positioning the IR-blocking film such that it is contacted on its major surfaces by the unplasticized polymer sheets; and, (4) laminating the at least three layers by heating the assembled layers at a temperature of at least 120° C. and at a pressure greater than atmospheric pressure.

DETAILED DESCRIPTION OF THE INVENTION

In one embodiment, the present invention is a laminate article that is useful for blocking infra red (IR) light transmission, but transparent to at least some, preferably most, wavelengths of visible light. A laminate of the present invention blocks transmission of IR light either by absorbing IR light frequencies or by reflecting IR light frequencies such that they are not transmitted through the laminate. IR light frequencies are those in the range of from about 0.75µ to about 400µ. A laminate of the present invention comprises an IR-reflective or IR-absorptive film such as is known and described in publications from, for example, Minnesota Manufacturing and Mining Company (3M) or Southwall Technologies, Inc. and migration or leaching of mobile species from the interlayer to the interface of such a film can lead to corrosion in the laminate. However, multi-layer IR-blocking films imbedded in laminates using PVB interlayers can have a problem, that is edge brightening, that results from liquid plasticizer leaching out of a plasticized interlayer sheet and migrating into the edges of the imbedded film causing the edge brightening effect. Another interlayer-related problem encountered with coated IR-blocking films is that interlayers that absorb moisture and contain acidic functional groups and various ions can corrode the metal flakes or coatings that are present on some IR-blocking films. Laminates of the present invention do not contain plasticizers or other mobile components that can migrate or leach, and additionally do not promote the absorption of water. Thus the laminates of the present invention substantially reduce the occurrences of interlayer-related defects described herein.

Suitable interlayers of the present invention are non-plasticized thermoplastic polymers that are transparent to at least some frequencies of the visible light spectrum. Suitable thermoplastic polymers are those that can adhere to glass or other transparent rigid material, such as polycarbonate for example, either directly or using of an adhesive film layer, and also to the IR-blocking film. Such suitable thermoplastic interlayer materials include, for example: polyurethane polymers; polyvinyl chloride polymers; and acid copolymers (inclusive of terpolymers) obtained by copolymerization of ethylene and α,β-unsaturated carboxylic acids having from 3 to 8 carbon atoms, and/or derivatives thereof, including esters, carboxylic acid salts, and anhydrides. Preferred are the acid copolymers of ethylene and α,β-unsaturated carboxylic acids, and/or salts thereof. Particularly preferred are salts of acid copolymers, such salts being conventionally known, and referred to herein, as ionomers. Suitable ionomers are commercially available from, for example, E.I. DuPont de Nemours and Company, sold under the tradename of Surlyn®.

A suitable thermoplastic interlayer for use with an IR film as described here is one which can impart properties suitable for use in a laminated glazing structure. Unplasticized PVB, for example, would not be suitable for use as the interlayer which is in direct contact with the IR film because unplasticized PVB is not suitable for use in glazing due to properties such as high modulus and low tensile strength, which would negatively impact the performance of the glazing in such applications as windows and automobile windshields, for example.

While it is contemplated that the IR-blocking laminate can be laminated directly to at least one rigid transparent material such as a glass or polycarbonate sheet, a laminate of the present invention can optionally include at least one other layer of transparent, plasticized interlayer material which is used as an intervening layer between the IR-blocking laminate and the rigid transparent material, with the proviso that the at least one layer of plasticized interlayer material cannot directly contact the IR-blocking film. In other words, an IR-blocking laminate of the present invention comprises at least two layers of suitable non-plasticized interlayer materials having positioned there between, and in continuous direct contact with, a suitable IR-blocking film. As contemplated herein, optional plasticized interlayer materials are laminated to the outer layers of the IR-blocking laminate. For example, plasticized PVB can be laminated to at least one surface of the IR-blocking laminate, and the resulting laminate can be laminated to at least one sheet of glass, and preferably the laminate can be laminated between two sheets of glass.

In another embodiment, the present invention is a process for preparing an IR-blocking laminate of the present invention. A laminate of the present invention can be obtained by assembling, in order, (1) a first sheet of a suitable non-plasticized interlayer material, (2) an IR-blocking film, and (3) a sheet of a second suitable non-plasticized interlayer material. The first and second non-plasticized interlayer materials can be the same or different interlayer materials. Preferably they are the same, but using different materials may be advantageous in some circumstances.

It is preferable that the interlayer materials are maintained as dry as possible (<0.20% water) by keeping them in sealed packages or by storing at a controlled relative humidity prior to lamination. Preferably, the interlayer materials are stored at a relative humidity of 23% or less. The assembled layers of film can then be laminated together at temperatures and times suitable to complete the lamination of the layers. Suitable temperatures and lamination times can depend on the particular materials being laminated. The time required for lamination can depend on the lamination temperature. Suitable lamination conditions of temperature and time can be readily discerned by one of ordinary skill in the art. Generally, it can be preferred to carry out the lamination at a temperature of at least about 120° C. for at least about 15 minutes. Generally, the assembled laminate layers can be heated in an autoclave for the desired time to effect bonding between the layers.

It can be optional that at least one of the layers of laminate materials used in the IR-blocking laminate is primed using a priming agent—prior to lamination—that can increase the peel strength of the laminate. In other cases it can be required to use a priming agent in order to obtain satisfactory peel strength. Satisfactory 90° peel strength in a laminate of the present invention is at least about 2.0 oz/inch, preferably at least about 3.5 oz/inch, more preferably at least about 4.0 oz/inch, and most preferably about 4.5 oz/inch. Peel strength is determined according to ASTM Standard D3330/D3330M-02 using an Instrumentors, Inc., Model SP-102B-3M90 Slip/Peel Tester fitted with a MB-10 load cell. Peels were made at a 90 degree angle using 1 inch wide samples. The peels were made at platen speeds of 1 inch and 2 inches per minute.

In a surprising development, it can be preferable to prime only the IR-blocking film layer to maximize the peel strength. Preferred priming agents are silane compounds or solutions thereof. More preferred are aminosilane compounds as priming agents. The silane priming agents can be used as a solution in a solvent such as methanol, ethanol, n-propyl alcohol, i-propyl alcohol, water, mixtures of any of these and/or other solvents suitable for dissolving the silane priming agent. The priming agent can be applied by any conventional method to any of the component layers of the IR-blocking laminate. It can be preferable that the priming agent is applied to one layer of the IR-blocking laminate, and more preferable that the priming agent is applied directly to the IR-blocking film. In any case, after the priming agent is applied, it can be preferred that the primed layer is allowed to dry at ambient temperature before the lamination process described hereinabove is started.

EXAMPLES

The Examples are for illustrative purposes only, and are not intended to limit the scope of the invention.

Example 1

An IR-blocking laminate of the present invention was prepared using a multi-layered IR-reflecting film available from 3M Innovative Products Company, and two sheets of ionomer resin available from E.I. DuPont de Nemours and Company as SENTRYGLAS®-PLUS Ionoplast resin. The 6 inch by 6 inch laminates were prepared using conventional lamination techniques with 15-mil sheets of SENTRYGLAS®-PLUS on either side of a 5 inch by 5 inch sheet of the IR-blocking film (one half inch of cutback around the edges of the laminate) and the pre-laminate was vacuum bagged and then heated in an autoclave at 143° C. for 30 minutes at 200 psi pressure.

This laminate sample was inspected for defects, including corrosion, dimpling, air bubbles, and delamination. No defects were present. This laminate sample was then subjected to a bake test at 90° C. for five (5) weeks, and no edge color developed.

Comparative Example 1

The procedure of Example 1 was repeated except that two PVB resin (22.4% hydroxyl) sheets, plasticized with 36 pph tetraethylene glycol 2-heptanoate (4G7), were used instead of the ionomer resin sheeting. The sample was subjected to the bake test (90° C./5 weeks) and developed very bright red edge color measuring 5 mm wide. This edge color was present on all four edges.

Comparative Example 2

The procedure of Example 1 was repeated except that two PVB resin sheets (18.5% hydroxyl), plasticized with 36 pph triethylene glycol 2-hexanoate (3GO), were used instead of the ionomer resin sheeting. The sample was subjected to the bake test (90° C./5 weeks) and developed a uniform greenish-yellow edge color measuring 1 mm wide. This edge color was present on all four edges.

Example 2

A 0.05%, by volume and weight of A-1100 silane (gamma-aminopropyltriethoxysilane), manufactured by OSi Specialties, in an isopropanol:water (2:1) solvent was prepared by diluting 0.1 mL of the silane in 200 mL of the isopropanol mixture followed by stirring for one hour. An IR-blocking film available from 3M was dipped into the silane solution and allowed to dry. A pre-laminate structure was prepared having the following construction:

Aluminum foil/primed IR film/SENTRYGLAS®-PLUS/ glass. The laminate was autoclaved at 143° C. for 30 minutes. The 90° peel strength between the primed film and the ionoplast interlayer measured 7.78±0.90 oz/inch.

Example 3

The procedure of Example 2 was repeated except that the SENTRYGLAS®-PLUS was primed with the silane solution, and the IR-blocking film was not primed. The peel strength on the resulting laminate measured 4.65±0.51 oz/inch.

Example 4

The procedure of Example 2 was repeated except that both the IR-blocking film and the ionoplast resin were primed. The peel strength of the resulting laminate was 4.18±0.40.

Example 5

The procedure of Example 2 was repeated except that none of the layers of the laminate was primed. The peel strength of the resulting laminate was 2.52±0.22.

Example 6

IR reflective laminates of the present invention were prepared using 2 mil thick "XIR-70" and "XIR-75" coated IR reflective films manufactured by Southwall Technologies, Inc., and two sheets of 15 mil SENTRYGLAS®-PLUS. The 12 inch by 12 inch laminates were prepared using conventional lamination techniques with 15 mil sheets of SENTRYGLAS®-PLUS on either side of the 10 inch by 10 inch sheets of IR blocking films (one inch edge cutback around the edges of the laminates) and the pre-laminate was vacuum bagged and then heated in an autoclave at 135° C. for 30 minutes at 200 psi pressure. The laminates were inspected for corrosion and other defects but none were found. The laminate samples were then subjected to a bake test at 90° C. for six (6) weeks, and no corrosion or color change developed.

Comparative Example 3

The procedure of Example 6 was repeated except that two PVB resin (22.4% hydroxyl) sheets, plasticized with 36 pph tetraethylene glycol 2-heptanoate (4G7), were used instead of the ionomer resin sheeting. The samples were subjected to the bake test (90° C./6 weeks) and they developed many spots of corrosion on the reflective coating of the XIR films.

What is claimed is:

1. A glass laminate useful for blocking the transmission of IR light, comprising a multiple layer interlayer comprising: (1) two thermoplastic polymer sheets; (2) a film positioned between the thermoplastic polymer sheets such that the film is in contact on each of its surfaces with the sheets, and (3) a glass layer, wherein (a) the film can either reflect or absorb IR light, (b) the thermoplastic polymer sheets comprise an unplasticized ethylene/$\alpha,\beta$-unsaturated carboxylic acid copolymer ionomer prepared from ethylene and $\alpha,\beta$-unsaturated carboxylic acids having from 3 to 8 carbon atoms wherein the acid groups of the copolymer have been at least partially neutralized, and (c) the multiple layer interlayer does not develop edge color when subjected to a bake test at 90° C. for five weeks.

2. The glass laminate of claim 1 wherein at least one of the layers of laminate materials used in the IR-blocking laminate is primed using a priming agent prior to lamination.

3. The glass laminate of claim 1 wherein the film is primed using a priming agent prior to lamination.

4. The glass laminate of claim 3 wherein the priming agent is a silane compound or solutions thereof.

5. The glass laminate of claim 3 wherein the priming agent is a silane compound in a solution of a solvent selected from the group consisting of methanol, ethanol, n-propyl alcohol, i-propyl alcohol, water, and mixtures of any of these.

6. The glass laminate of claim 3 wherein the priming agent is an aminosilane compound or solutions thereof.

7. The glass laminate of claim 6 wherein the aminosilane compound is selected from the group consisting of gamma-aminopropyltriethoxysilane and N-(2-aminoethyl)-3-aminopropyltrimethoxysilane, or similar hydrolyzable amino silanes.

8. The glass laminate of claim 6 wherein the aminosilane compound is selected from the group consisting of gamma-aminopropyltriethoxysilane and N-(2-aminoethyl)-3-aminopropyltrimethoxysilane.

9. The glass laminate of claim 6 wherein the 90° peel strength of the laminate as measured by peeling one of the thermoplastic polymer sheets from the film is at least about 4.0 oz/inch.

10. The glass laminate of claim 6 consisting essentially of in sequence and wherein each layer is adhered to the adjacent layer or film: a layer of glass, one of the two thermoplastic polymer sheets, the film, the second of the two thermoplastic polymer sheets, and a second layer of glass.

11. The glass laminate of claim 3 wherein the priming agent is an aminosilane compound in a solution of a solvent selected from the group consisting of methanol, ethanol, n-propyl alcohol, i-propyl alcohol, water, and mixtures of any of these.

12. The glass laminate of claim 11 wherein the aminosilane is selected from the group consisting of gamma-aminopropyltriethoxysilane and N-(2-aminoethyl)-3-aminopropyltrimethoxysilane.

13. The glass laminate of claim 3 wherein 90° peel strength of the laminate as measured by peeling one of the thermoplastic polymer sheets from the film is at least about 3.5 oz/inch.

14. The glass laminate of claim 3 wherein 90° peel strength as measured by peeling one of the thermoplastic polymer sheets from the film of the laminate is at least about 4.0 oz/inch.

15. The glass laminate of claim 3 consisting essentially of in sequence and wherein each layer is adhered to the adjacent layer or film: a layer of glass, one of the two thermoplastic polymer sheets, the film, the second of the two thermoplastic polymer sheets, and a second layer of glass.

16. The glass laminate of claim 3 wherein the film is a multi-layered IR-reflecting film.

17. The glass laminate of claim 1 wherein the 90° peel strength of the laminate as measured by peeling one of the thermoplastic polymer sheets from the film is at least about 2.0 oz/inch.

18. The glass laminate of claim 1 consisting essentially of in sequence and wherein each layer is adhered to the adjacent layer or film: a layer of glass, one of the two thermoplastic polymer sheets, the film, the second of the two thermoplastic polymer sheets, and a second layer of glass.

19. The glass laminate of claim 1 further comprising in sequence and wherein each layer is adhered to the adjacent layer or film: one of the two thermoplastic polymer sheets, the film, the second of the two thermoplastic polymer sheets, at least one layer of transparent, plasticized interlayer material, and the glass layer.

20. The glass laminate of claim 1 comprising in sequence and wherein each layer is adhered to the adjacent layer or film: the glass layer, one of the two thermoplastic polymer sheets, the film, the second of the two thermoplastic polymer sheets, a plasticized polyvinyl butyral layer, and a second layer of glass.

21. The glass laminate of claim 1 wherein the film contains metal flakes or coating.

22. The glass laminate of claim 1 comprising in sequence and wherein each layer is adhered to the adjacent layer or film: a layer of glass, one of the two thermoplastic polymer sheets, the film, the second of the two thermoplastic polymer sheets, a plasticized polyvinyl butyral layer, and a layer of polycarbonate sheet.

23. The glass laminate of claim 1 wherein the film is a multi-layered IR-reflecting film.

24. A multiple layer interlayer article useful for blocking the transmission of infra red (IR) light comprising: (1) two thermoplastic polymer sheets; and (2) a film positioned between the thermoplastic polymer sheets such that the film is in contact on each of its surfaces with the sheets, wherein the film can either reflect or absorb IR light, wherein the thermoplastic polymer sheets comprise an unplasticized ethylene/$\alpha,\beta$-unsaturated carboxylic acid copolymer ionomer prepared from ethylene and $\alpha,\beta$-unsaturated carboxylic acids having from 3 to 8 carbon atoms wherein the acid groups of the copolymer have been at least partially neutralized, and wherein the multiple layer interlayer does not develop edge color when subjected to a bake test at 90° C. for five weeks.

25. A process for manufacturing a multiple layer interlayer article as claimed in claim 24 comprising:
a. providing the two thermoplastic polymer sheets;
b. providing the film;
c. forming a multiple layer interlayer comprising the film adhered to the two thermoplastic polymer sheets; and
d. forming the multiple layer interlayer article.

26. A process for manufacturing a multiple layer interlayer article as claimed in claim 24 comprising sequentially:
a. providing the two thermoplastic polymer sheets;
b. providing the film;
c. priming at least one of the multiple layers of the laminate by application of a primer solution;
d. assembling the two thermoplastic polymer sheets and the film to form an assembly by positioning the thermoplastic polymer sheets such that the film is in contact on each of its surfaces with the sheets,
e. laminating the assembly at a temperature of at least 120° C. and at a pressure greater than atmospheric pressure.

27. A process for manufacturing a glass laminate useful for blocking the transmission of IR light comprising the steps:
a. providing two thermoplastic polymer sheets comprised of an unplasticized ethylene/$\alpha,\beta$-unsaturated carboxylic acid copolymer ionomer prepared from ethylene and $\alpha,\beta$-unsaturated carboxylic acids having from 3 to 8 carbon atoms wherein the acid groups of the copolymer have been at least partially neutralized;
b. providing a film that can either reflect or absorb IR light;
c. providing two layers of glass;
d. assembling the two thermoplastic polymer sheets and film to form a multiple layer assembly;
e. laminating the multiple layer assembly to form a multiple layer interlayer comprising the film adhered to layers formed from the two thermoplastic polymer sheets, wherein the multiple layer interlayer does not develop edge color when subjected to a bake test at 90° C. for five weeks; and
f. forming a glass laminate with the two glass layers on the outside and the multiple layer interlayer on the inside, wherein at least one thermoplastic polymer sheet is adhered to at least one layer of the glass.

28. The process of claim 27 further comprising priming using a priming agent prior to the lamination at least one of two thermoplastic polymer sheets or the film.

29. The process of claim 27 further comprising priming the film using a silane priming agent prior to the assembling.

30. The process of claim 29 wherein the silane priming agent is an aminosilane compound or solutions thereof.

31. The process of claim 30 wherein the laminating comprises heating the multiple layer assembly at a temperature of at least 120° C. and at a pressure greater than atmospheric pressure.

* * * * *

UNITED STATES PATENT AND TRADEMARK OFFICE
CERTIFICATE OF CORRECTION

PATENT NO. : 7,291,398 B2  Page 1 of 1
APPLICATION NO. : 10/695721
DATED : November 6, 2007
INVENTOR(S) : Jerrel C. Anderson It is certified that error appears in the above-identified patent and that said Letters Patent is hereby corrected as shown below:

Claim 13, column 7, line 5, add --the-- after wherein

Claim 14, column 7, line 9, add --the-- after wherein
line 10 add --of the laminate-- after strength
line 11 delete "of the laminate" after film Claim 26, column 8, line 23, delete "." after C Claim 27, column 8, line 44, delete "." after C Claim 31, column 8, line 58, delete "." after C Signed and Sealed this Twenty-fourth Day of June, 2008

JON W. DUDAS
*Director of the United States Patent and Trademark Office*